United States Patent
Sugimoto

(10) Patent No.: US 6,552,748 B1
(45) Date of Patent: Apr. 22, 2003

(54) CAMERA WHICH AUTOMATICALLY AND PROPERLY FOCUSES IN SITUATIONS WITH RELATIVELY LOW LUMINANCE FOREGROUND OBJECTS AND HIGH LUMINANCE BACKGROUND OBJECTS

(75) Inventor: Kazuhiko Sugimoto, Shijonawate (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/027,057

(22) Filed: Feb. 20, 1998

(30) Foreign Application Priority Data

Feb. 25, 1997 (JP) ............................................. 9-040389

(51) Int. Cl.[7] .............................................. H04N 5/232
(52) U.S. Cl. ...................................................... 348/354
(58) Field of Search ................................. 348/345, 349, 348/353, 354, 356; 396/79, 96, 77, 133, 135; H04N 5/232

(56) References Cited

U.S. PATENT DOCUMENTS

| | | |
|---|---|---|
| 4,392,726 A | 7/1983 | Kimura |
| 4,422,097 A | 12/1983 | Inuiya |
| 4,814,889 A | 3/1989 | Covey |
| 5,235,375 A | 8/1993 | Yamana et al. |
| 5,249,058 A | 9/1993 | Murata et al. |
| 5,430,483 A * | 7/1995 | Haruki ........................ 348/349 |
| 5,534,923 A * | 7/1996 | Suda .......................... 348/354 |
| 5,539,462 A | 7/1996 | Lee et al. |
| 5,923,371 A * | 7/1999 | Iijima ......................... 348/356 |
| 6,222,588 B1 * | 4/2001 | Yamazaki et al. .......... 348/355 |

FOREIGN PATENT DOCUMENTS

| | | |
|---|---|---|
| EP | 0 390 091 | 3/1990 |
| JP | 57-161708 | 10/1982 |
| JP | 3-68280 | 3/1991 |
| JP | 04-318772 | 11/1992 |
| JP | 08-122627 | 5/1996 |
| JP | 08-334683 | 12/1996 |
| JP | 10-336508 | 12/1998 |

* cited by examiner

Primary Examiner—Tuan Ho
(74) Attorney, Agent, or Firm—Michaelson & Wallace; Peter L. Michaelson

(57) ABSTRACT

An image pickup signal extracted by a gate circuit is applied to a brightness signal generating circuit and a brightness signal is generated. By a high pass filter, high frequency component of the brightness signal is extracted. A digital integrator integrates high frequency signals of one image plane, and outputs the result as an evaluating value to a CPU. CPU detects a situation where there are two peaks of focus evaluating values and the position having maximum focus evaluating value does not correspond to the optical in-focus position, and drives a focus motor such that a focus lens is set at an position where the focus evaluating value is smallest between the two peaks.

5 Claims, 5 Drawing Sheets

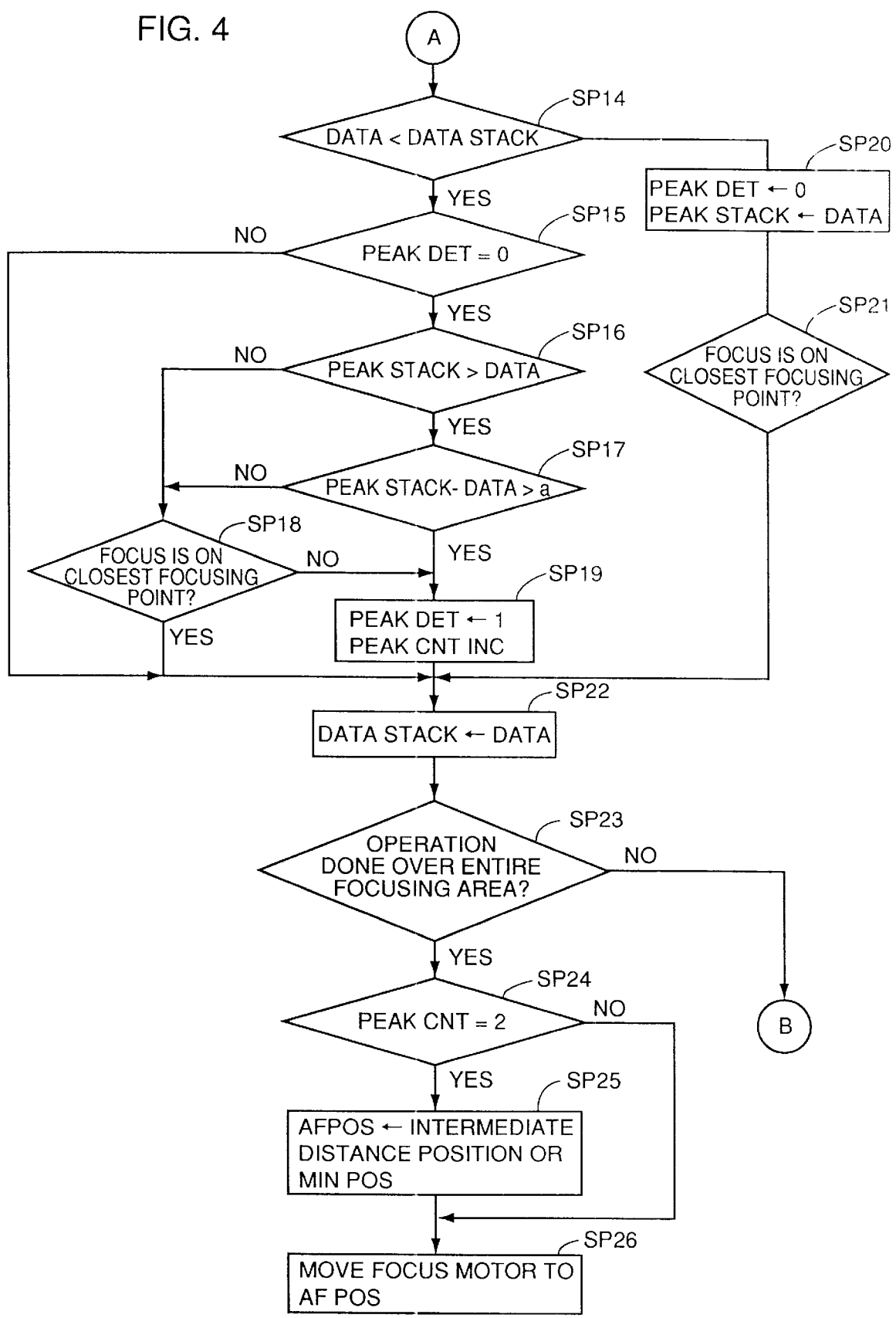

CAMERA WHICH AUTOMATICALLY AND PROPERLY FOCUSES IN SITUATIONS WITH RELATIVELY LOW LUMINANCE FOREGROUND OBJECTS AND HIGH LUMINANCE BACKGROUND OBJECTS

BACKGROUND OF THE INVENTION

1. Field of the Invention

The present invention relates to an auto focus camera. More specifically, the present invention relates to an auto focus camera in which a lens of a digital still camera is driven to an in-focus position.

2. Description of the Background Art

Conventional photographic cameras adopt optical auto focusing such as phase difference detecting method. In a digital still camera, a video signal from an image pickup device such as a CCD (Charge Coupled Device) is used for evaluating a state of focus control, as it is advantageous in that there is no parallax essentially, and that highly accurate focusing is possible even when the depth of field is shallow or when an object is at a long distance. Further, any special sensor for auto focusing is not required, which leads to very simple structure.

An example of such an auto focus camera is disclosed in Japanese Patent Laying-Open No. 3-68280. This reference discloses a technique for speeding up focusing operation in which a focus lens is moved between an infinite focusing position and a close focusing position step by step, with each step being relatively large, focus evaluating value of each step is obtained, and the focus lens is moved close to a position corresponding to the maximum focus evaluating value over the distance to the object. Thereafter, the focus lens is moved step by step with each step being smaller, near the optimal object distance. The maximum evaluating value is found among the focus evaluating values of respective small steps, whereby the speed of focusing operation is increased.

FIG. 5 shows relation between the lens position and the focus evaluating value. As shown in FIG. 5, generally, the focus evaluating value is highest at the in-focus position, and it decreases as the amount of defocus increases.

As already described, in auto focusing operation, the focus lens is normally driven such that the maximum focus evaluating value is attained. However, where the object to be photographed has low illuminance and there is a portion having high brightness in the photographing field, as shown in FIG. 6, the focus evaluating value at the in-focus position tends to be low, while the focus evaluating value tends to be higher at a position further out of focus.

More specifically, when there is a clear and bright object at a position of FIG. 6(*a*) while there are objects which are not sharp at positions of FIGS. 6(*b*) and (*c*), rising edges of video signals corresponding to portions having high brightness become acute and high frequency component increases, as the amount of defocus increases, at objects 6(*b*) and 6(*c*). When the position of the focus lens is set so as to attain the maximum focus evaluating value in such situation, the lens is focused on the position (b) or (c) of FIG. 6, and not well focused on the desired object.

SUMMARY OF THE INVENTION

Therefore, an object of the present invention is to provide an auto focus camera capable of driving a focus lens to an in-focus position even when there are two peaks of focus evaluating values in a situation where illuminance is low and a highly bright portion exists in the photographing field.

Briefly stated, the present invention provides an auto focus apparatus for driving the focus lens to a position where high frequency component of a video signal output from an image pickup device is maximized, in which evaluating values generated based on the high frequency component are detected by a evaluating value detecting circuit, and in response to detection of two peak evaluating values, the focus lens is set by a lens driving circuit at a position where the lens is focused at a prescribed distance.

Therefore, according to the present invention, focus evaluating values of the entire focusing area are measured and when there are two peaks of focus evaluating values, the lens is driven such that the lens is focused at a prescribed distance. Therefore, significant defocus can be avoided.

In a preferred embodiment, a position corresponding to the lowest evaluating value between the two peak values detected by the evaluating value detecting circuit is regarded as the in-focus position, and the lens driving circuit drives the lens to the in-focus position.

More preferably, the video signal output from the image pickup device is converted by an A/D converting circuit to a digital signal, brightness signal component is extracted from the video signal which has been converted to the digital signal, by a brightness signal generating circuit, high frequency component is extracted from the provided brightness signal component by a filter circuit, and applied to the evaluating value detecting circuit.

In a preferred embodiment, the lens driving circuit drives the lens first to an infinite focusing end in the initial state and thereafter moves the lens to the closest focusing point, and in response to detection of two peak values therebetween, sets the lens at the in-focus position.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a flow chart showing latter half of the auto focus processing subroutine.

DESCRIPTION OF THE PREFERRED EMBODIMENTS

Figure 1:
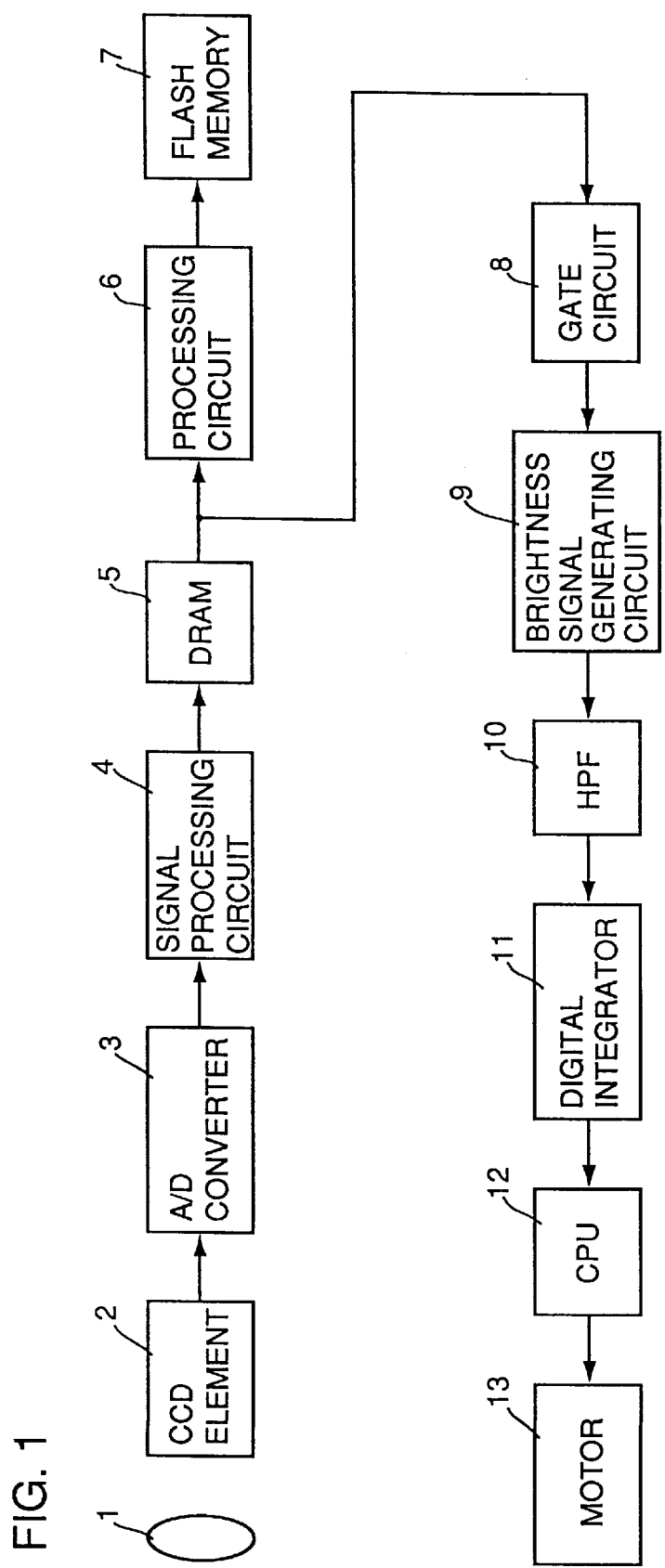
FIG. 1 is a block diagram showing an embodiment of the present invention.

FIG. 1 is a schematic block diagram showing an embodiment of the present invention. Referring to FIG. 1, a CCD element 2 photo-electrically converts incident light entering through lens 1, and outputs a resulting image pickup signal to an A/D converter 3. A/D converter 3 converts the image pickup signal to digital image data, and outputs the data to a signal processing circuit 4. Signal processing circuit 4 performs white balance correction and y correction on the digital image data. A DRAM 5 stores image data corresponding to one image plane corresponding to the image pickup signal obtained immediately after pressing of a release switch, not shown.

A processing circuit 6 performs known signal processing such as color separation on the image data corresponding to one image plane stored in DRAM 5, and performs image compression by software, and the compressed image data is stored in a flash memory 7 in the succeeding stage. Further, processing circuit 6 decompresses the compressed image data read from flash memory 7, applies the decompressed data to a liquid crystal monitor, not shown, whereby the picked up image is displayed.

Further, image data stored in DRAM 5 is applied to a gate circuit 8, image data at the central portion of an image is extracted for auto focus control and applied to a brightness signal generating circuit 9. Brightness signal generating circuit 9 generates a brightness signal from the extracted image data, and a high pass filter (HPF) 10 extracts high frequency component from the brightness signal and applies it to a digital integrator 11. Digital integrator 11 integrates the high frequency component of one image plane, and outputs the result as an evaluating value, to CPU 12. CPU 12 drives motor 13 for auto focus control in accordance with a program represented by the flow chart of FIGS. 2 and 3, and lens 1 is driven in a given direction, thus realizing auto focus control.

Figure 2:
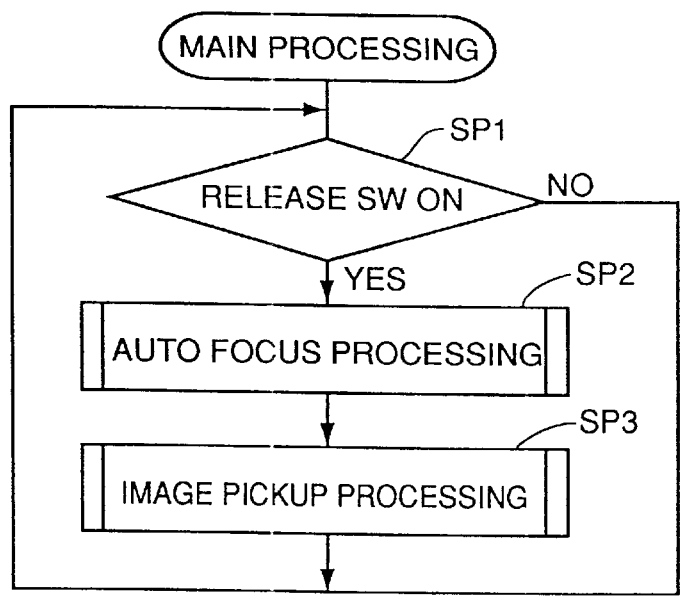
FIG. 2 is a flow chart showing the overall operation of one embodiment of the present invention.
Figure 3:
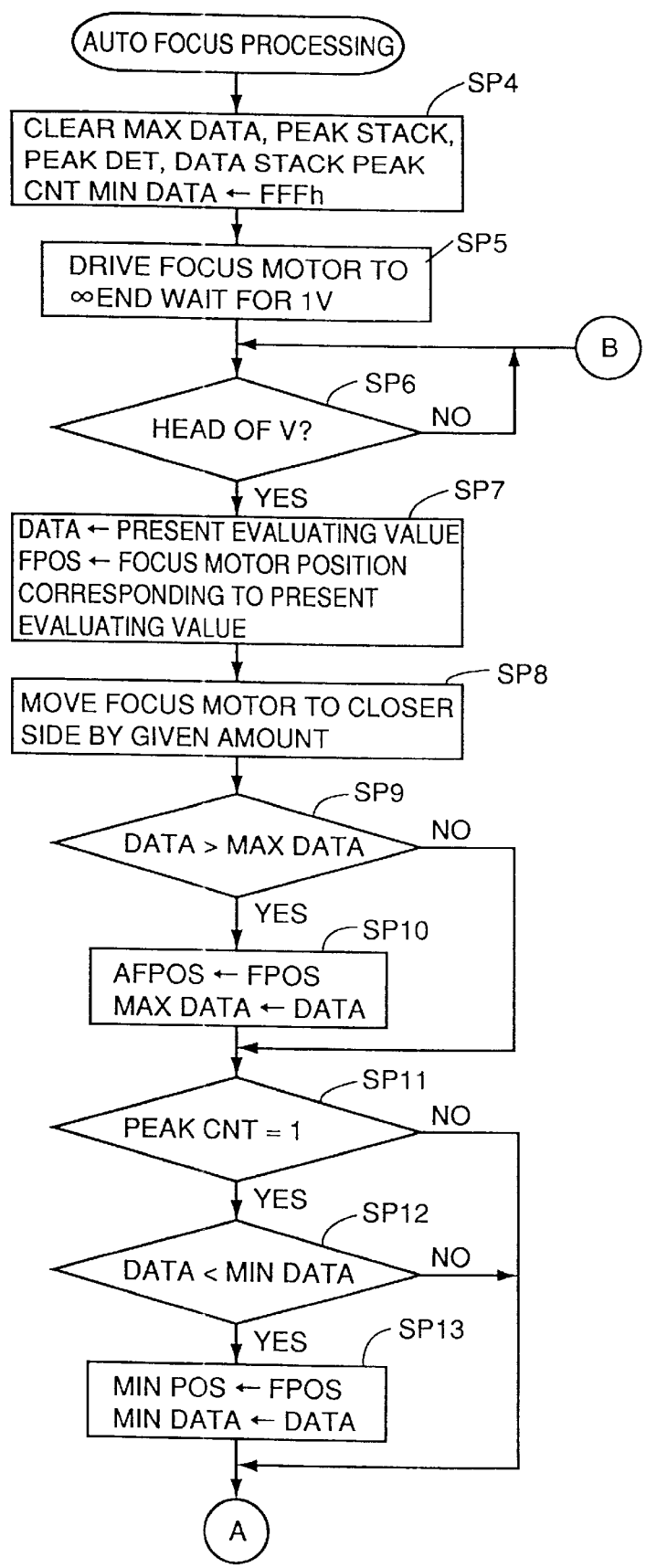
FIG. 3 is a flow chart showing former half of an auto focus processing subroutine shown in FIG. 2.

FIG. 2 is a flow chart representing an operation of one embodiment of the present invention, and FIGS. 3 and 4 are flow charts showing an auto focus processing subroutine shown in FIG. 2.

Specific operation of one embodiment of the present invention will be described with reference to FIGS. 1 to 4. Referring to FIG. 2, CPU 12 waits for a pressing of the release switch. When it is determined that the release switch is ON in step (SP in the figure) SP1, auto focus process of step SP2 is performed, and in step SP3, image pickup signal is taken and signal processing is performed. Auto focus processing is in accordance with the flow charts of FIGS. 3 and 4. Referring to FIG. 3, in step SP4, areas for "MAX DATA", "PEAK STACK", "PEAK DET", "DATA STACK", and "PEAK CNT" in an RAM (not shown) contained in CPU 12 are cleared, and $FFFF_H$ is stored in "MINI DATA" area, and in this manner, initialization is completed. In step SP5, CPU 12 drives focus lens 1 to an ∞ end point, which is the start position for auto focusing, by a focus motor 13. Thereafter, control waits for the lapse of one vertical scanning period, as exposure period to obtain data at this focus position.

In step SP6, for synchronous processing with vertical synchronization, control waits for the head of the vertical scanning period, and when the head is found, an output value from digital integrator 11, which is the evaluating value at present is stored in "DATA" area of the RAM, and position of the focus lens corresponding to the evaluating value is stored in "FPOS" area in step SP7, and in step SP8, focus lens 1 is moved by a prescribed amount to the closer focusing position by focus motor 13.

In step SP9, whether "DATA" corresponds to "MAX DATA", that is, whether it represents the maximum value of focusing is determined. If it is the maximum value, then the position of the focus motor which has been stored in "FPOS" area is stored in "AFPOS" area, and the value in "DATA" area is stored in "MAX DATA" area. If the data is not the maximum value, in step SP11, how many peaks has been counted by "PEAK CNT" is determined. If "PEAK CNT" is 1 and a peak has been detected, in step SP12, whether "DATA" is smaller than the initially set "MINI DATA" is determined. If "DATA" is smaller than "MINI DATA", the focus motor position of "FPOS" is stored in "MINI POS", and "DATA" is stored in "MINI DATA" area.

Referring to FIG. 4, if the data is not larger than the last evaluating value in step SP14, if it is determined that any peak is not yet detected in step SP15, if it is determined that the evaluating value is smaller than the value of "PEAK STACK" in step SP16 and if it is determined that decrease from the peak value is larger than a prescribed value a in step SP17, then it is determined that a peak is detected, a "PEAK DET" flag is set and "PEAK CNT" is incremented in step SP19.

Even when it is determined in step SP17 that decrease from the peak value is smaller than the prescribed value a, it is considered that the peak value is attained, if the position of the focus lens is at the closest focusing point in step SP18. Therefore, "PEAK DET" flag is set and "PEAK CNT" is incremented. The prescribed amount a is set taking into consideration the fact that the evaluating value includes noise component in advance, and when the evaluating value attains to the peak value and thereafter falls by the prescribed amount a, it can determined that the true peak is attained, even when there is the influence of noise.

When it is determined that the data is increased from the last evaluating value in the above mentioned step SP14, then "PEAK DET" flag is cleared and the present evaluating value is stored in "PEAK STACK" as updated maximum value, in step SP20. Even when the evaluating value is increased, it is determined as the peak value when the focus lens position is at the closest focusing point, and therefore "PEAK DET" flag is cleared and "PEAK CNT" is incremented.

Figure 5:
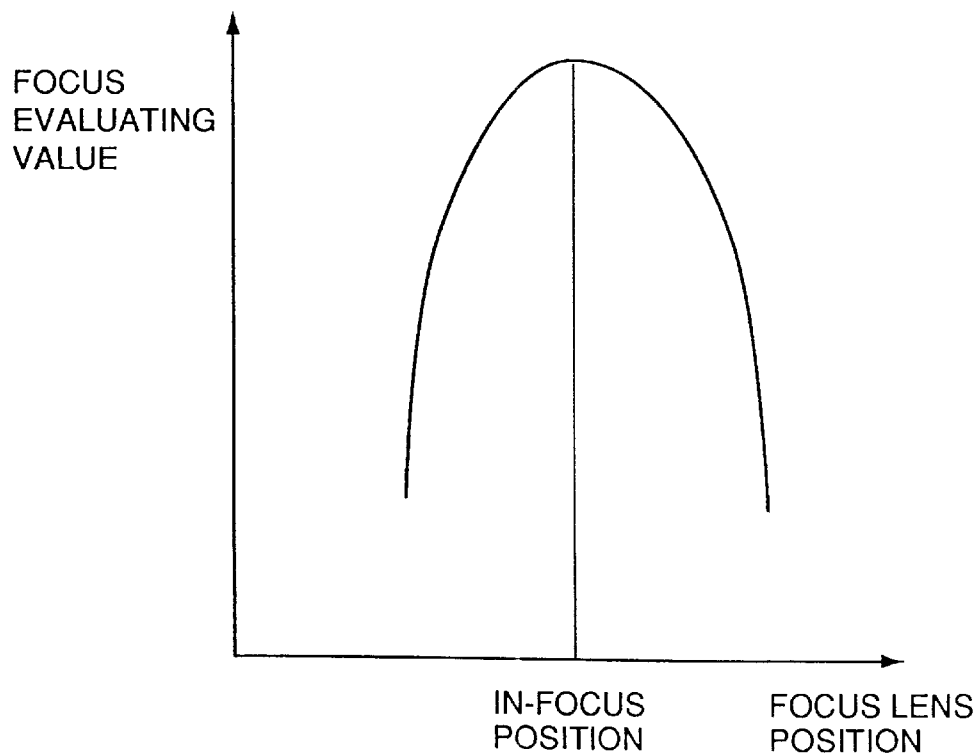
FIG. 5 shows relation between the lens position and the focus evaluating value.
Figure 6:
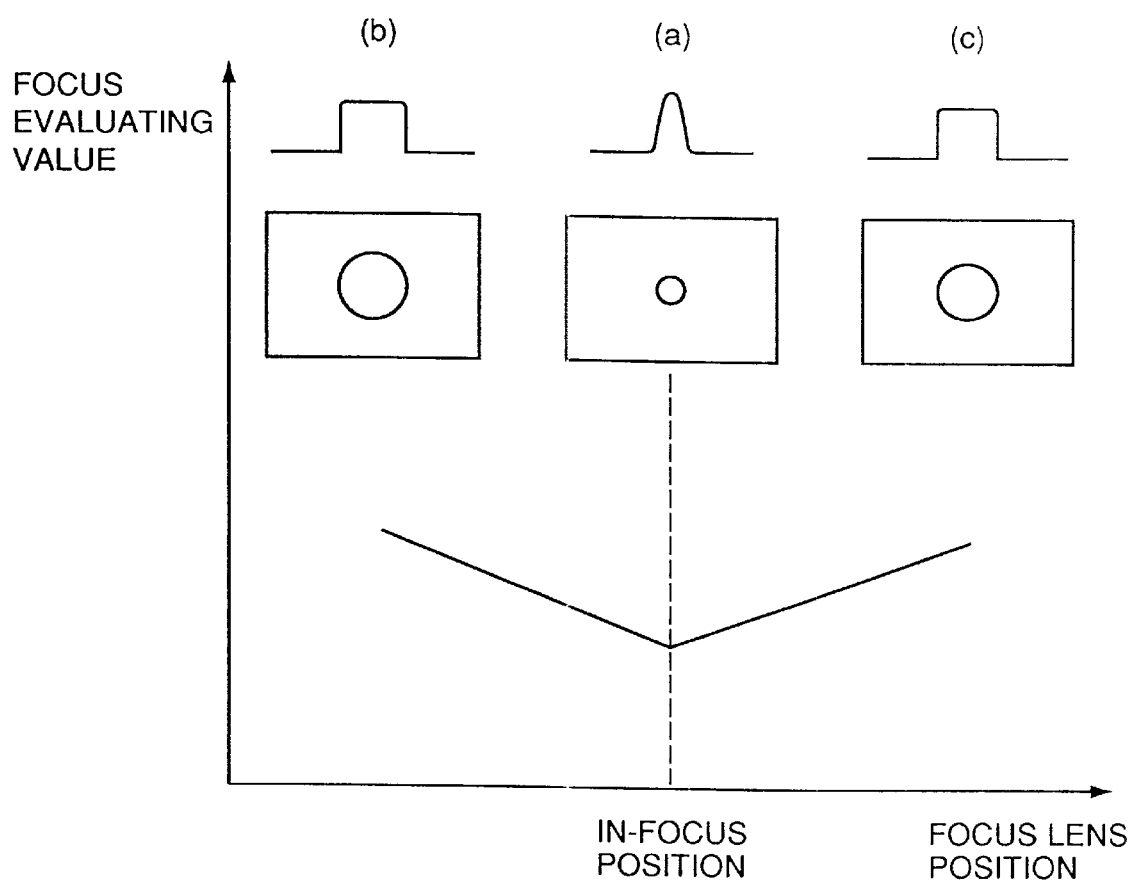
FIG. 6 shows relation between the in-focus position and the evaluating value when illuminance is low and a highly bright portion exists in the object.

In step SP22, the present evaluating value is stored in "DATA STACK". In step SP23, whether auto focus processing in every focus area is completed or not is determined. If not, the flow returns to step SP6 and the operation of steps SP6 to SP23 is repeated. When it is determined in step SP24 that "PEAK CNT" is 2, a focus lens position where in-focus state is attained at an intermediate distance, or a focus lens position where the evaluating value is minimum and "PEAK CNT" 1 (focus lens position smallest between two peaks), is set in the area of "AFPOS". Then, in step SP26, the focus lens is driven to the position corresponding to "AFPOS" and auto focus processing is completed. By performing the process along such a flow chart, when there is a peak of the focus evaluating value at the correct in-focus position as in the case of FIG. 5, the step SP 25 is skipped, the lens is moved to the lens position corresponding to the peak value and stopped at the position, thereby completing focusing operation. Meanwhile, when there are two peaks, that is, one on the infinite side and one on the closer side as shown in FIG. 6, the lens positions corresponding to the peak values are not regarded as the in-focus positions. In this situation, by the processing in step SP 25, the lens is moved to a predetermined position at an intermediate distance between the infinite point and the closest point, or to a lens position assuming the minimum focus evaluating value, stopped at that point and focusing operation is completed.

As described above, according to one embodiment of the present invention, where illuminance is low and a portion having high brightness exists in the object, if a situation in which there are two peaks of focus evaluating values and the position corresponding to the maximum focus evaluating value does not correspond to the optical infocus position is detected, focus lens 1 is set to a position where the focus evaluating value is minimum between the two peaks, so that significant defocus can be avoided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An auto focus apparatus driving a focus lens to a position where high frequency component of a video signal output from an image pickup device attains a maximum value, comprising:

an evaluating value detector detecting an evaluating value generated based on said high frequency component; and a lens driver, responsive to detection of two peak evaluating values by said evaluating value detector, setting said focus lens to a position bringing the focus lens in-focus at a prescribed distance, wherein said lens driver drives said lens, to a position where the evaluating value is lowest between the two peak evaluating values, as an in-focus position.

2. The auto focus apparatus according to claim 1, wherein:

said lens driver drives said lens to an infinite focusing end in an initial state, moves the lens to a closest focusing point side, and in response to detection of said two peak evaluating values therebetween, drives said lens to the in-focus position.

3. An auto focus apparatus driving a focus lens based on high frequency component of a video signal output from an image pickup device, comprising:

an evaluating value detector detecting an evaluating value generated based on said high frequency component; and a lens driver setting, when one peak evaluating value is detected by said evaluating value detector, said focus lens to a position corresponding to the detected one peak evaluating value, and setting, when two peak evaluating values are detected by said evaluating value detector, said focus lens to a prescribed fixed position, regardless of a result of detection by said evaluating value detector.

4. The auto focus apparatus according to claim 3, further comprising:

an A/D converter converting the video signal output from said image pickup device to a digital signal;

brightness signal generator extracting a brightness signal component from the video signal converted to the digital signal by said A/D converter; and a filter extracting high frequency component from the brightness signal component extracted by said brightness signal generator so as to form an extracted high frequency component and applying the extracted high frequency component to said evaluating value detector.

5. An auto focus apparatus driving a focus lens to a position where high frequency component of a video signal output from an image pickup device attains a maximum value, comprising:

an evaluating value detector detecting an evaluating value generated based on said high frequency component; and a lens driver, responsive to detection of two peak evaluating values by said evaluating value detector, setting said focus lens to a position bringing the focus lens in-focus at a prescribed position;

wherein an image plane as sensed by the image pickup device contains an area of relatively high brightness and an object having relatively low illuminance with respect to said area and in response to which the two peak evaluating values occur, and the lens driver, in response to the two peak evaluating values, sets the position of the lens at a predefined intermediate position situated within a range between lens positions associated with said peaks.

* * * * *